(12) United States Patent
Pastore et al.

(10) Patent No.: US 10,903,747 B2
(45) Date of Patent: *Jan. 26, 2021

(54) APPARATUS AND METHODS FOR CONTROLLING A SWITCH MODE POWER CONVERTER USING A DUTY CYCLE STATE MACHINE

(71) Applicant: Power Integrations, Inc., San Jose, CA (US)

(72) Inventors: Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,776

(22) Filed: Nov. 14, 2019

(65) Prior Publication Data
US 2020/0127572 A1 Apr. 23, 2020

Related U.S. Application Data

(63) Continuation of application No. 16/166,639, filed on Oct. 22, 2018, now Pat. No. 10,505,458.

(51) Int. Cl.
*H02M 3/335* (2006.01)
*H02M 1/00* (2006.01)

(52) U.S. Cl.
CPC ..... *H02M 3/33507* (2013.01); *H02M 1/0061* (2013.01); *H02M 2001/0025* (2013.01)

(58) Field of Classification Search
None
See application file for complete search history.

(56) References Cited

U.S. PATENT DOCUMENTS

| 6,137,696 | A | * | 10/2000 | Hall | H02M 3/33523 |
| | | | | | 323/902 |
| 9,071,152 | B2 | | 6/2015 | Morong et al. | |
| 10,505,458 | B1 | * | 12/2019 | Pastore | H02M 1/0061 |
| 2008/0136341 | A1 | * | 6/2008 | Araki | H02M 1/36 |
| | | | | | 315/209 R |
| 2016/0056704 | A1 | * | 2/2016 | Deboy | H02M 3/33592 |
| | | | | | 363/21.13 |
| 2016/0079857 | A1 | * | 3/2016 | Lo Iacono | H02M 3/156 |
| | | | | | 323/271 |

* cited by examiner

*Primary Examiner* — Jeffrey A Gblende
(74) *Attorney, Agent, or Firm* — Brian H. Floyd

(57) ABSTRACT

A power conversion system includes a switch mode power converter including a switch coupled to regulate an output voltage to a regulation value in response to a feedback signal. A controller is coupled to deliver a gate drive signal to the switch during an enabled control condition. The controller is further coupled to inhibit the gate drive signal to the switch during an inhibited control condition. A duty cycle state machine included in controller is coupled to adjust a duty cycle of the gate drive signal according to a plurality of discrete duty cycle states.

20 Claims, 7 Drawing Sheets

… (1)

APPARATUS AND METHODS FOR CONTROLLING A SWITCH MODE POWER CONVERTER USING A DUTY CYCLE STATE MACHINE

CROSS REFERENCE TO RELATED APPLICATIONS

This application is a continuation of U.S. patent application Ser. No. 16/166,639, filed on Oct. 22, 2018, now abandoned, which is incorporated in its entirety herein by reference.

BACKGROUND INFORMATION

Field of the Disclosure

The present invention relates to controlling a switch mode power converter using a duty cycle state machine and more particularly to controlling a discrete duty cycle of a boost converter coupled to a secondary of a flyback converter.

Background

Many electronic devices, such as cell phones, laptops, etc., are powered by direct current (dc) power derived from a power supply. Conventional wall outlets generally deliver a high voltage alternating current (ac) power that is converted to regulated dc power in order to be used as a power source for consumer electronic devices. In some applications a power conversion system may cascade one or more power converter stages including a power factor correction (PFC) stage. Switch mode power converters are commonly used due to their high efficiency, small size, and low weight to convert a high voltage ac power to a regulated dc power.

One topology of a switch mode power converter is a flyback converter, which uses a transformer to transfer switched energy from a primary winding to a secondary winding. Another topology is a boost converter, which converts an input voltage to a boosted (higher) output voltage.

BRIEF DESCRIPTION OF THE DRAWINGS

Non-limiting and non-exhaustive embodiments for controlling a switch mode power converter using a duty cycle state machine are described with reference to the following figures, wherein like reference numerals refer to like parts throughout the various views unless otherwise specified.

Figure 1A:
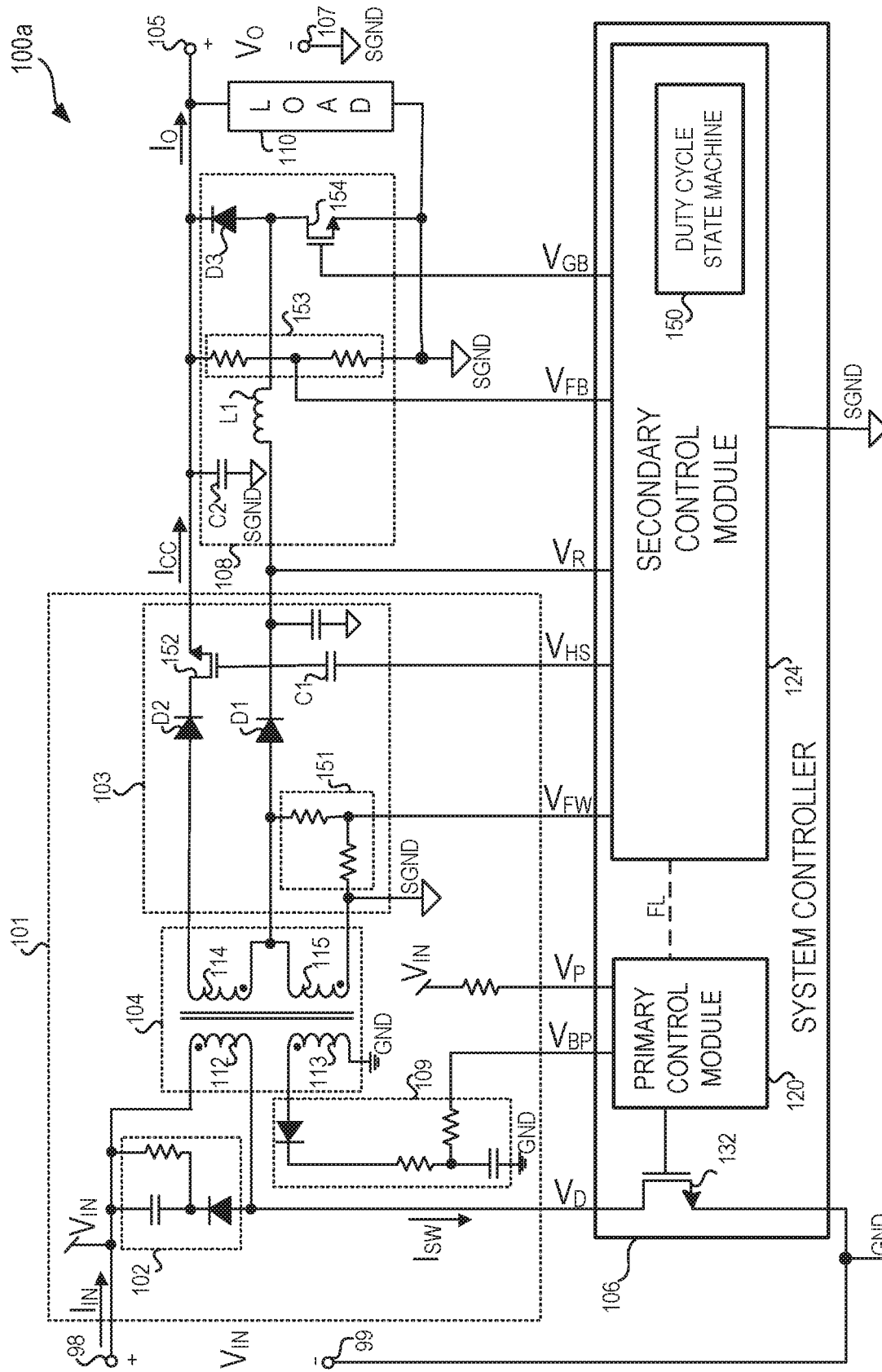
FIG. 1A illustrates an example power conversion system including a switch mode power converter and a duty cycle state machine according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments for controlling a switch mode power converter using a duty cycle state machine.

DETAILED DESCRIPTION

In the following description, numerous specific details are set forth in order to provide a thorough understanding for controlling a switch mode power converter using a duty cycle state machine. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment for controlling a switch mode power converter using a duty cycle state machine. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off-state" or "off", the transistor blocks current and/or does not substantially conduct current. Conversely, when a transistor is in an "on-state" or "on", the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments, an integrated controller circuit may be used to drive a power switch when regulating energy provided to a load. Also, for purposes of this disclosure, "ground" or "ground potential" refers to a reference voltage or potential against which all other voltages or potentials of an electronic circuit or integrated circuit (IC) are defined or measured.

As introduced above, a power conversion system may cascade one or more power converter stages including a power factor correction (PFC) stage. A modern configuration based on this concept may include a PFC stage using a flyback topology (i.e., a flyback converter) coupled to another switch mode power converter operating asynchronously with the flyback converter. For instance, the switch mode power converter may be a boost converter electrically coupled to a secondary winding of the flyback converter. In this way the boost converter can advantageously operate as an additional power conversion stage for regulating an output voltage at a load.

Additionally, when used as part of a cascaded system (e.g., a system having a flyback converter and a boost converter), the boost converter may advantageously use a simpler and/or more relaxed control approach. For instance, a control approach using a constant frequency boost switch drive with cycle skipping may be used to regulate the output voltage without sacrificing system regulation specifications. Using a constant frequency cycle skipping approach may advantageously simplify loop compensation and/or component requirements thereby improving overall loop response and dynamic performance. However, cycle skipping may also lead to audible noise. Accordingly, there is a need for a constant frequency cycle skipping control approach which eliminates and/or substantially reduces audible noise.

An apparatus and methods for controlling a switch mode power converter using a duty cycle state machine are disclosed herein. The duty cycle state machine may provide one or more signals to vary a discrete value of the duty cycle. This in turn may advantageously reduce cycle skipping and associated audible noise. Additionally, the duty cycle state machine may select the discrete duty cycle based on one or more system operating conditions.

FIG. 1A illustrates an example power conversion system 100a including a switch mode power converter 108 and a duty cycle state machine 150 according to an embodiment of the present invention. The power conversion system 100a includes a first power converter 101, a system controller 106, the switch mode power converter 108, and a load 105. System input power (i.e., input current $I_{IN}$ and input voltage $V_{IN}$) may be delivered between input terminals 98 and 99, relative to a primary ground GND, and converted into system output power (i.e., output current $I_O$ and output voltage $V_O$). System output power may be delivered to the load 110 between output terminals 105 and 107 relative to a local ground SGND.

The system controller 106 is electrically coupled to the first power converter 101 and the switch mode power converter 108 to control and regulate the transfer of energy delivered to the load 110. As illustrated, the first power converter 101 can provide an intermediate current $I_{CC}$ to the load (e.g., a constant current) and also provide secondary power (e.g., supply voltage $V_R$) to an input of the switch mode power converter 108.

Also as shown, the first power converter 101 may use a flyback topology (i.e., a flyback converter) including a clamp 102, a transformer 104, secondary side components 103, and a rectifier block 109. The transformer 104 includes a first primary winding 112, a second primary winding 113, a first secondary winding 114, and a second secondary winding 115. In the depicted example, the system controller 106 includes a primary switch 132, a primary control module 120, and a secondary control module 124.

The primary control module 120 may control switching of the primary switch 132 to provide switched power (i.e., switched current $I_{SW}$ and switched drain voltage $V_D$) at the primary winding 112, which in turn may magnetically couple the switched power to the secondary windings 114-115 and to primary winding 113. Coupled power at the primary winding 113 may be rectified with rectifier block 109 to provide a rectified supply voltage $V_{BP}$ to the primary control module 120. Coupled power at the secondary windings 114-115 may be transferred to the load 110 through the secondary components 103.

Additionally, the primary control module 120 may receive one or more additional signals from within and external to the system controller 106. For instance, the signal VP, external to the system controller 106, may be provided to the primary control module 120 for under-voltage lockout (UVLO) and/or over-voltage (OV) protection. Also, the primary control module 120 may receive a signal FL from the secondary control module 124. The signal FL may be a galvanically isolated signal (e.g., a magnetically coupled and/or optically coupled signal) conveying control information from the secondary control module 124. In this way, the secondary control module 124 may be galvanically isolated from the primary control module 120 such that signals at the secondary control module 124 may be referenced to local ground SGND and isolated from signals at the primary control module 120, which are referenced to primary ground GND.

As illustrated, the secondary control module 124 is coupled to the secondary components 103. The secondary components 103 include a divider 151, a diode D1, a diode D2, a capacitor C1, and an NMOS switch 152. Also as shown, the divider 151 is electrically coupled to the secondary winding 115, and may provide a secondary winding signal $V_{FW}$, useful for communicating information relating to the operation of primary switch 132.

In transferring power from the secondary winding 114, the secondary control module 124 may couple gate drive signal $V_{HS}$ through capacitor C1 to the gate of NMOS switch 152 in order to block and/or to pass current (i.e., current $I_{CC}$). For instance, coupled power at secondary winding 114 may be rectified with diode D2 and passed to the load 110 when the gate drive signal $V_{HS}$ controls NMOS switch 152 to conduct current. Alternatively, coupled power at secondary winding 114 may be blocked from the load 110 when the gate drive signal $V_{HS}$ controls NMOS switch 152 to block current.

Coupled power at secondary winding 115 may be rectified with diode D1 and transferred in order to supply intermediate power (i.e., power including supply voltage $V_R$) to the secondary control module 124 and to an input of the switch mode power converter 108.

As illustrated, the secondary control module 124 is also coupled to the switch mode power converter 108. The switch mode power converter 108 includes an inductor L1, a capacitor C2, a feedback network 153, a diode D3, and a switch 154 configured in a boost topology (i.e., a boost converter).

In transferring and regulating power from the secondary winding 115, the secondary control module 124 may control the switch mode power converter 108 to convert intermediate power (i.e., power including supply voltage $V_R$) and to provide the converted power to the load 110. The secondary control module 124 may receive a feedback signal $V_{FB}$ from the feedback network 153 and in response provide a gate drive signal $V_{GB}$ (e.g., a switching signal) to the gate of switch 154 to transfer power to the load 110.

According to the teachings herein, the secondary control module 124 may include the duty cycle state machine 150. The duty cycle state machine 150 may be used to control the on time (and/or the duty cycle) of the gate drive signal $V_{GB}$, thereby reducing and/or eliminating audible noise.

Figure 1B:
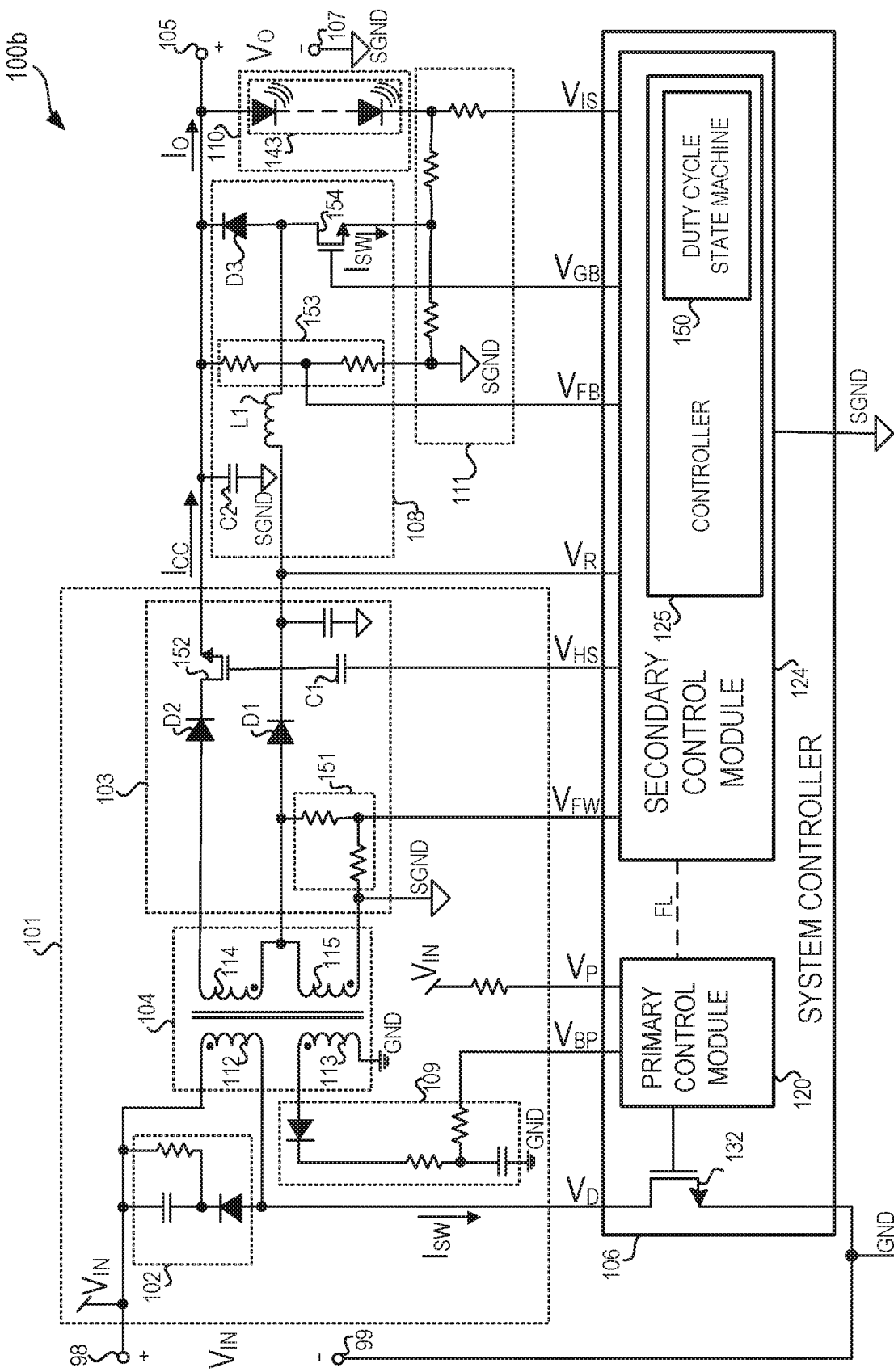
FIG. 1B illustrates another example power conversion system including a switch mode power converter and a duty cycle state machine according to another embodiment of the present invention.

FIG. 1B illustrates another example power conversion system 100b including a switch mode power converter 108 and a duty cycle state machine 150 according to another embodiment of the present invention. The power conversion system 100b is similar to power conversion system 100a, except it includes a current sensing network 111, and it illustrates additional features of the load 110 and the secondary control module 124. For instance, as illustrated, the load 110 may include light emitting diodes 143. Additionally, the secondary control module 124 may include a controller 125. The controller 125 in turn may comprise the duty cycle state machine 150 and may be configured to control the switch mode power converter 108.

As shown, the current sensing network 111 may provide a sense signal $V_{IS}$ to the secondary control module 124. The sense signal $V_{IS}$ can be proportional to a drain/source current $I_{SW}$ of switch 154 and/or proportional to output current $I_O$. In this way the secondary control module 124 may provide an overcurrent feature to the power conversion system 100b. For instance, when the sense signal $V_{IS}$ exceeds a current sense threshold, then secondary control module 124 can adjust or inhibit gate control to switch 154.

Figure 2:
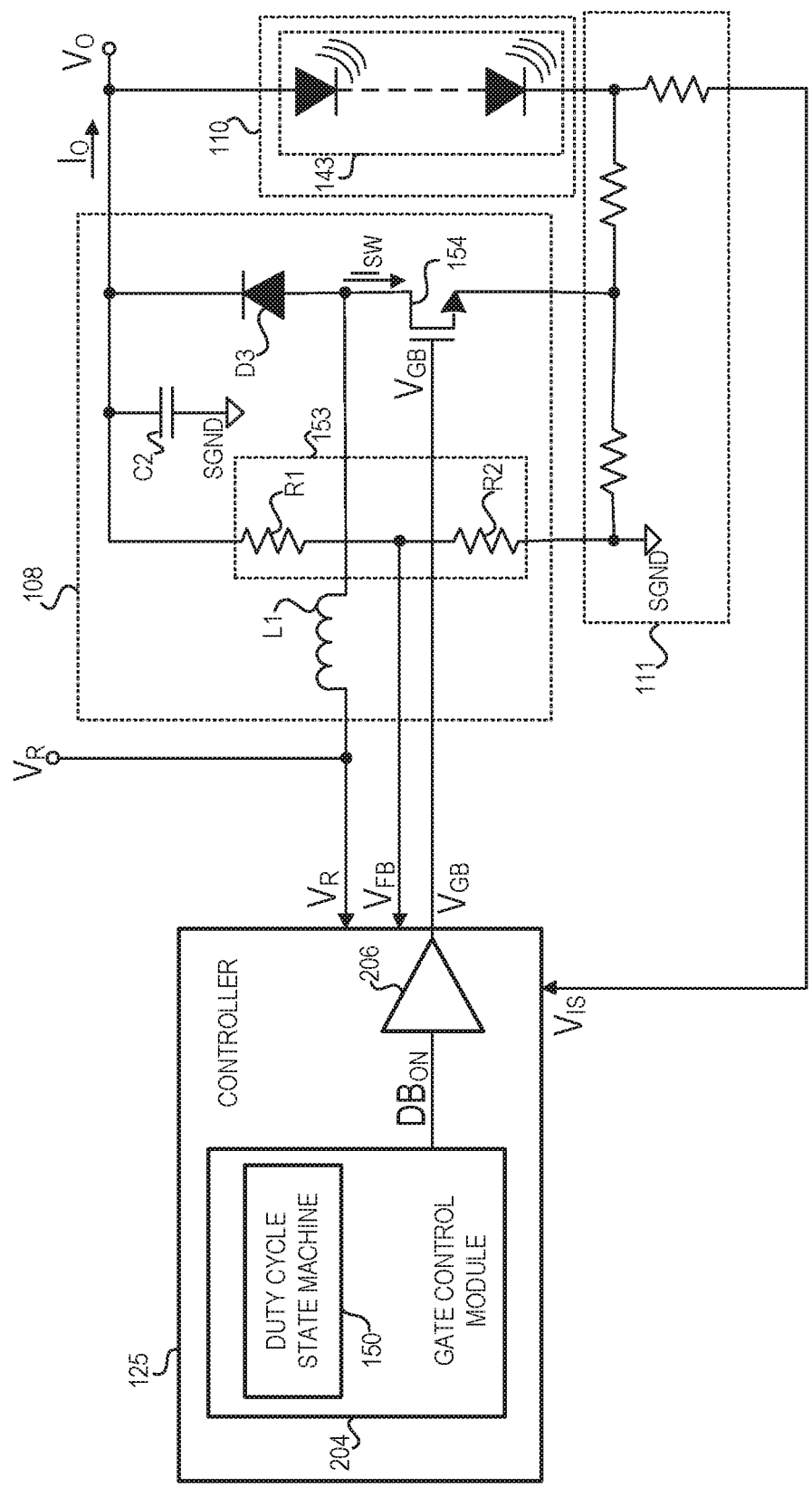
FIG. 2 illustrates an example switch mode power converter and controller using a duty cycle state machine according to an embodiment of the present invention.

FIG. 2 illustrates the switch mode power converter 108 and controller 125 using a duty cycle state machine 150 in accordance with an embodiment of the invention. The controller 125 may include a gate control module 204 and a buffer 206. A function of the controller 125 can be to control the switch 154 so that the switch mode power converter 108 converts power input (i.e., power including supply voltage $V_R$) into output power (i.e., output current $I_O$ and output voltage $V_O$).

As illustrated the gate control module 204 can include the duty cycle state machine 150 and can provide a signal $DB_{ON}$ to the buffer 206. According to an embodiment, the signal $DB_{ON}$ can be a digital signal which may be buffered by buffer 206 to provide a gate drive signal $V_{GB}$ to the switch 154 for controlling operation of the switch mode power converter 108. For instance, as shown the switch mode power converter 108 may be configured as a boost converter. According to an embodiment, the gate drive signal $V_{GB}$ may be provided with constant frequency and constant duty cycle determined by the duty cycle state machine 150.

Also as illustrated, the controller 125 can receive the sense signal $V_{IS}$, the feedback signal $V_{FB}$, and also receive power from supply voltage $V_R$. The gate control module 204 may receive the sense signal $V_{IS}$ and/or the feedback signal $V_{FB}$, and in response provide the signal $DB_{ON}$ with a constant frequency and duty cycle determined, in part, by the duty cycle state machine 150. The feedback signal $V_{FB}$ can be a voltage derived from a voltage divider formed by resistors R1 and R2 of the feedback network 153. As described above, the sense signal $V_{IS}$ can be a signal indicative of the drain/source current $I_{SW}$ and/or the output current $I_O$.

In controlling the switch mode power converter 108, the controller 125 may enable and/or inhibit the gate drive signal $V_{GB}$ based, in part, on the feedback signal $V_{FB}$. For instance, according to an embodiment, when the feedback signal $V_{FB}$ exceeds a reference value, then the controller 125 may inhibit the gate drive signal $V_{GB}$ so that the switch 154 operates in a high-impedance (i.e., blocking) state. Alternatively, when the feedback signal $V_{FB}$ falls below the reference value, the controller 125 may enable the gate drive signal $V_{GB}$ to be provided to the gate of the switch 154 with constant frequency. In this way the controller 125 may control the switch 154 to regulate output voltage $V_O$ by skipping pulses during an "inhibited" condition and by allowing pulses during an "enabled" condition.

Pulse skipping, which is also known as on-off control, can advantageously provide a stable, yet fast loop response. As introduced above, pulse skipping may unfortunately introduce audible noise. The duty cycle state machine 150 may be used to vary the duty cycle of the signal $DB_{ON}$ so that audible noise is reduced and/or eliminated.

Although the embodiment depicted in FIG. 2 shows a controller 125 and switch mode power converter 108 configured in a boost topology, other configurations for use in a power conversion system and/or in a standalone switch mode power supply system are possible. For instance, the controller 125 and switch mode power converter 108 may be configured in other topologies including buck and buck-boost. Additionally, the controller 125 may be configured to use greater or fewer signals. For instance, the controller 125 may receive power from a voltage source other than the supply voltage $V_R$. The controller 125 may receive greater or fewer signals than the feedback signal $V_{FB}$ and the sense signal $V_{IS}$. Also, in some configurations, the controller 125 may also provide more than just one gate drive signal $V_{GB}$ to control multiple switches.

Figure 3:
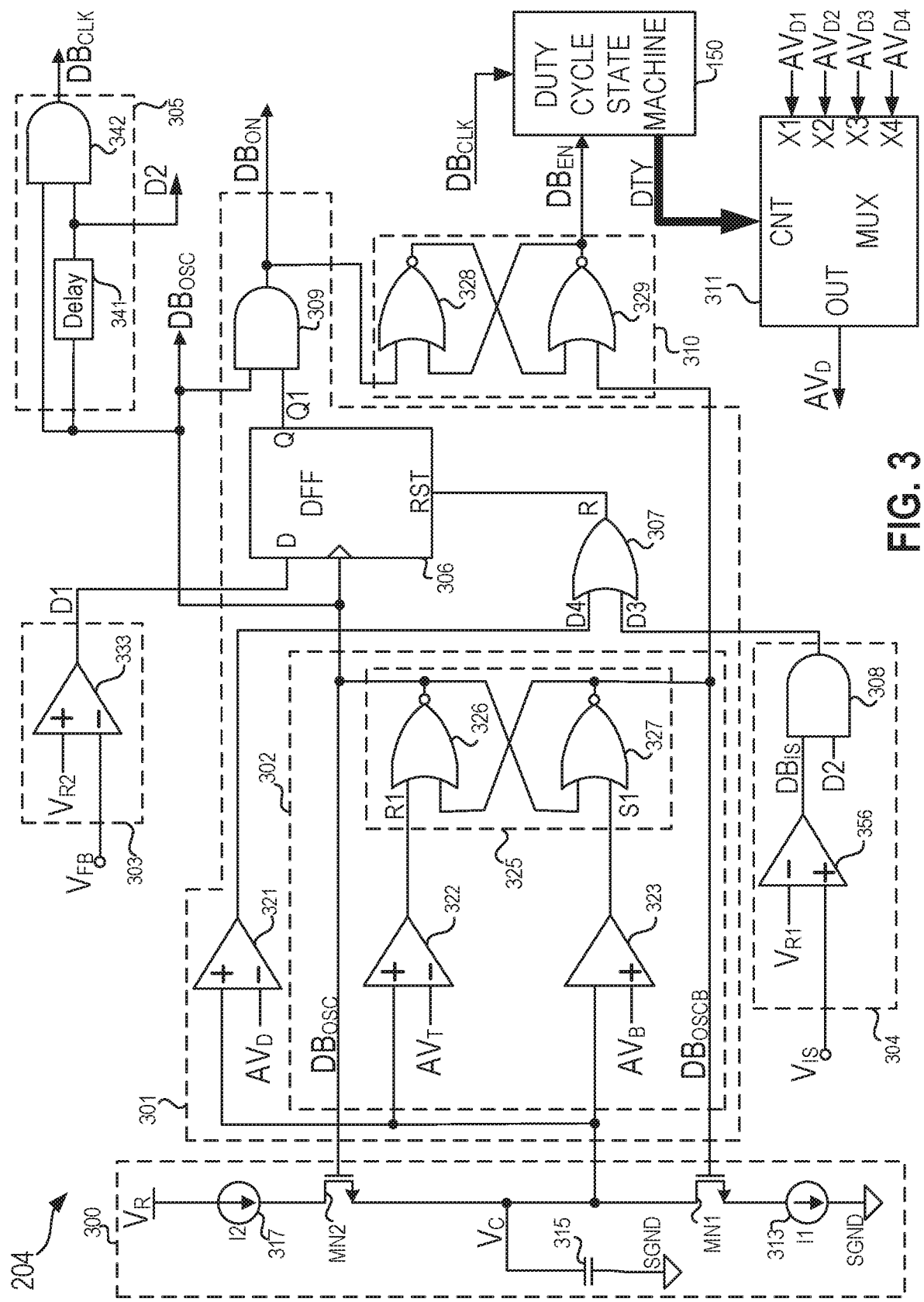
FIG. 3 illustrates an example circuit realization of a gate control module according to an embodiment of the present invention.

FIG. 3 illustrates an example circuit realization of the gate control module 204 according to an embodiment of the present invention. The gate control module 204 includes a triangle wave generator 300, a variable duty cycle square wave generator 301, a feedback comparator circuit 303, an overcurrent comparator circuit 304, a clock delay circuit 305, a RESET-SET (RS) latch 310, the duty cycle state machine 150, and a multiplexor 311. The variable duty cycle square wave generator 301 includes a square wave generator 302, a comparator 321, an OR-gate 307, a D-type flip flop (DFF) 306, and an AND-gate 309.

The triangle wave generator 300 is electrically coupled in a feedback configuration with the square wave generator 302 to generate a triangle signal $V_C$. The triangle wave generator 300 provides the triangle signal $V_C$ to the square wave generator 302, which, in response, generates an oscillator signal $DB_{OSC}$ and an inverted oscillator signal $DB_{OSCB}$. The oscillator signal $DB_{OSC}$ and the inverted oscillator signal $DB_{OSCB}$ are provided back to the triangle wave generator 300 in a positive feedback loop. By virtue of positive feedback the triangle signal $V_C$ may assume a triangular waveform.

As illustrated the triangle wave generator 300 includes a current source 317, an NMOS transistor MN2, a capacitor 315, a current source 313, and an NMOS transistor MN1. A first terminal of the capacitor 315 is electrically coupled to local ground SGND. The second terminal of the capacitor 315 is electrically coupled to the source of NMOS transistor MN2 and the drain of NMOS transistor MN1. Also, as shown the NMOS transistor MN2 is electrically connected between the current source 317 and the second terminal of capacitor 315 to source and/or to block a current I2 to the capacitor 315 in response to the oscillator signal $DB_{OSC}$ at the gate of NMOS transistor MN2. Additionally, the NMOS transistor MN1 is electrically connected between the current source 313 and the second terminal of the capacitor 315 to sink and/or block a current I1 from the capacitor 315 in response to the inverted oscillator signal $DB_{OSCB}$ at the gate of NMOS transistor MN1.

The alternating charging of the capacitor 315 by the current I2 and the discharging of the capacitor 315 by the current I1 can generate the triangle signal $V_C$. The triangle signal $V_C$ can assume a triangular waveform based on the magnitude of current I1 and the magnitude of current I2. For instance, in one non-limiting embodiment, currents I1 and I2 may be substantially time independent and the triangle signal $V_C$ may assume a triangular waveform. Additionally, in some embodiments the magnitude of current I1 can be substantially equal to a magnitude of current I2.

Also, as illustrated, the square wave generator 302 includes comparators 322-323 and a latch 325. The latch 325 includes NOR-gates 326-327, which are electrically cross-coupled to provide the oscillator signal $DB_{OSC}$ and the inverted oscillator signal $DB_{OSCB}$ in response to a set signal S1 and a reset signal R1. Comparator 323 provides the set signal S1 to NOR-gate 327 based on the comparison of the triangle signal $V_C$ with a reference signal $AV_B$. When the triangle signal $V_C$, at the inverting input of comparator 323, intersects (e.g., falls below) the reference signal $AV_B$, then the set signal S1 transitions high. In response, the oscillator signal $DB_{OSC}$ transitions high (i.e., a logic high) and the inverted oscillator signal $DB_{OSCB}$ transitions low (i.e., a logic low). When the oscillator signal $DB_{OSC}$ transitions high, NMOS transistor MN2 sources current I2 onto capacitor 315 causing the triangle signal $V_C$ to increase as a function of time.

The triangle signal $V_C$ increases until the triangle signal $V_C$ intersects (e.g., exceeds) a reference signal $AV_T$. Comparator 322 provides the reset signal R1 to NOR-gate 326 based on the comparison of the triangle signal $V_C$ with the reference signal $AV_T$. When the triangle signal $V_C$, at the non-inverting input of comparator 323, exceeds the reference signal $AV_B$, then the reset signal R1 transitions high. In response, the oscillator signal $DB_{OSC}$ transitions low and the inverted oscillator signal $DB_{OSCB}$ transitions high. When the inverted oscillator signal $DB_{OSCB}$ transitions high, NMOS transistor MN1 sinks current I1 from capacitor 315 causing the triangle signal $V_C$ to decrease as a function of time.

Figure 4:
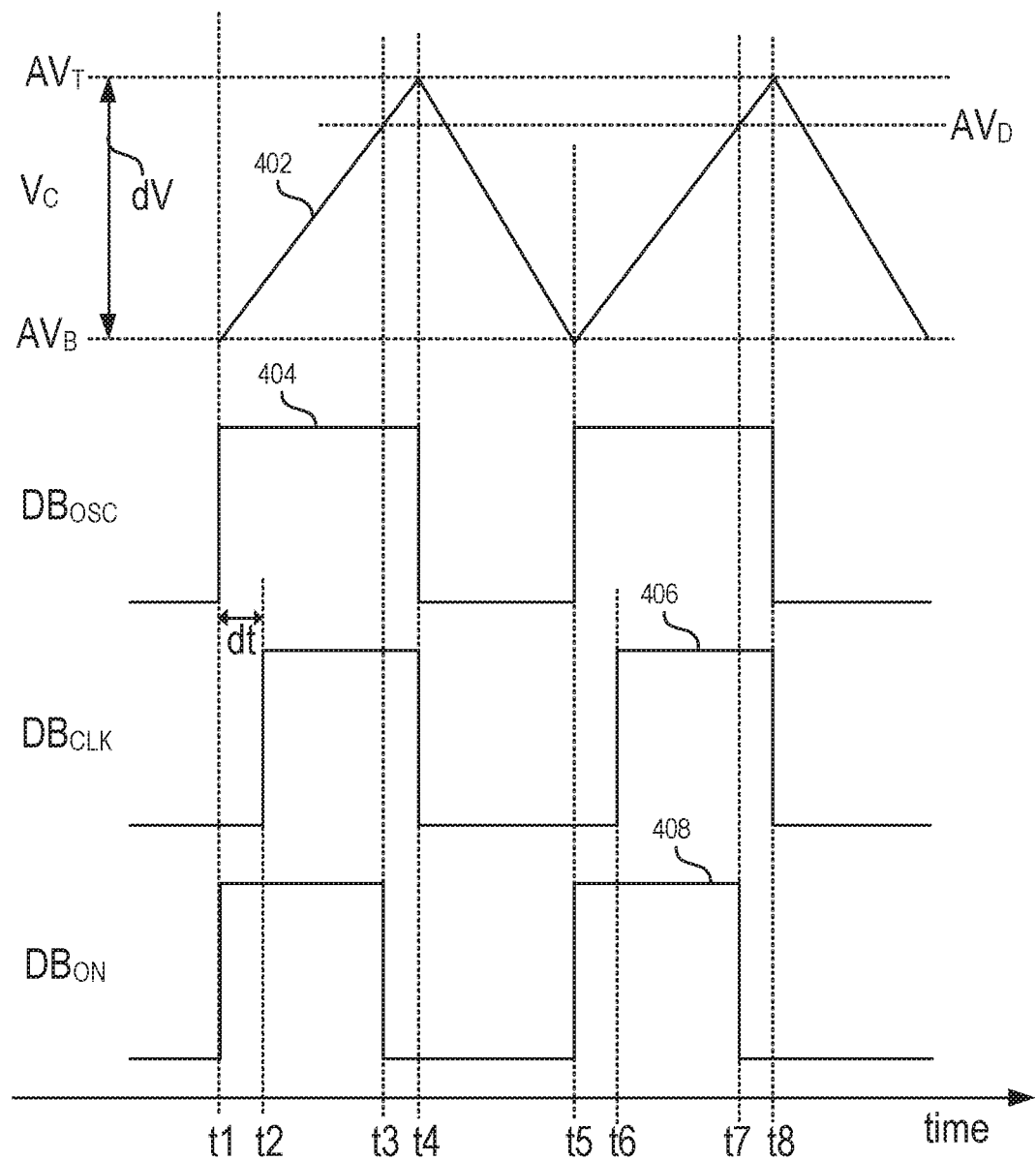
FIG. 4 illustrates corresponding switching signal waveforms of the example gate control module of FIG. 3.

FIG. 4 illustrates corresponding switching signal waveforms of the gate control module of FIG. 3. Waveform 402 may correspond to the triangle signal $V_C$ (e.g., a voltage signal) of height dV (e.g., a height dV of one volt), and waveform 404 may correspond to the oscillator signal $DB_{OSC}$. For instance, times t1 and t5 delineate when the triangle signal $V_C$ intersects the value of $AV_B$ (i.e., the reference signal $AV_B$) and when the latch 325 is set by comparator 323. At times t1 and t5 the oscillator signal $DB_{OSC}$ (i.e., waveform 404) transitions high and the triangle signal $V_C$ (i.e., waveform 402) increases as a function of time. Similarly, times t4 and t8 delineate when the triangle signal $V_C$ has intersected the value of $AV_T$ (i.e., the reference signal $AV_T$), and when the latch 325 is reset by comparator 322. Additionally, the period and frequency may be determined from times t1 and t5. For instance, the period may be determined by the difference of time t5 and time t1. In some embodiments, the frequency of signal $DB_{OSC}$ may be substantially equal to two hundred kilohertz (200 kHz).

As illustrated in FIG. 3, the variable duty cycle square wave generator 301 may be used to provide (i.e., to enable) the signal $DB_{ON}$ based on the feedback signal $V_{FB}$. The signal $DB_{ON}$ may be derived from a logical AND of a signal Q1 and the oscillator signal $DB_{OSC}$. As shown the DFF 306 receives a signal D1 at its "D" input and provides the signal Q1 based in part upon the value of D1. For instance, the signal Q1, and hence the signal $DB_{ON}$, may be forced to logic low (i.e., inhibited) when the signal D1 is low. Alternatively the signal Q1 may be clocked by the oscillator signal $DB_{OSC}$ (i.e., enabled) to have a variable duty cycle waveform (e.g., waveform 408) when the signal D1 is a high. The circuit features giving rise to inhibiting and enabling the signal $DB_{ON}$, based on the feedback signal $V_{FB}$, may be traced to feedback comparator circuit 303.

The feedback comparator circuit 303 can include a comparator 333 which provides the signal D1 based on a comparison the feedback signal $V_{FB}$ to a reference $V_{R2}$. As illustrated, when the feedback signal $V_{FB}$, at the inverting input, exceeds the reference $V_{R2}$, the comparator 333 may assert the signal D1 to a logic low. When the feedback signal $V_{FB}$ falls below the reference $V_{R2}$, the comparator 333 may assert the signal D1 to a logic high. With reference to FIG. 2, the feedback signal $V_{FB}$ can be indicative of the output voltage $V_O$. Thus, the control of signal $DB_{ON}$ relative to the reference $V_{R2}$ as shown in FIG. 3 allows the regulation of the output $V_O$ by pulse skipping (i.e., cycle skipping). When the feedback signal $V_{FB}$ exceeds the reference $V_{R2}$ the signal $DB_{ON}$ becomes inhibited (i.e., low) thereby inhibiting the gate drive signal $V_{GB}$. When the feedback signal $V_{FB}$ reduces below the reference $V_{R2}$ the signal $DB_{ON}$ becomes enabled thereby enabling the gate drive signal $V_{GB}$.

As shown in FIG. 3 the variable duty cycle square wave generator 301 may also be used to provide the signal $DB_{ON}$ with a variable duty cycle. Circuit features giving rise to duty cycle control may be traced from the comparator 321 to the DFF 306.

Comparator 321 compares the triangle signal $V_C$, at its non-inverting input, with a reference signal $AV_D$ to provide signal D4 to an input of the OR-gate 307. In this way, comparator 321 can assert the signal D4 to logic high when the triangle signal $V_C$ exceeds the reference signal $AV_D$ and to logic low when the triangle signal $V_C$ reduces below the reference signal $AV_D$. The OR-gate 307, in turn, can assert the signal R to logic high when the signal D4 is asserted high. Thus, the DFF 306 may reset the signal Q1 to a logic low when the triangle signal $V_C$ exceeds the reference signal $AV_D$.

To further illustrate, FIG. 4 shows waveform 408 (i.e., signal $DB_{ON}$) making a transition from low to high at times t1 and t5. However, at times t3 and t7 where the triangle signal $V_C$ exceeds the reference signal $AV_D$, the signal $DB_{ON}$ transitions from high to low while the oscillator signal $DB_{OSC}$ remains high. In this way the duty cycle (i.e., on time) of $DB_{ON}$ may be varied based on the value of the reference signal $AV_D$.

According to the teachings herein, the duty cycle state machine 150 may control and/or change the duty cycle of $DB_{ON}$ based on a system state (e.g., an operating condition). As shown in FIG. 3, the duty cycle state machine 150 may control duty cycle by varying the value of reference signal $AV_D$. The duty cycle state machine 150 can provide a control vector (e.g., a plurality of logic signals) DTY to a control input CNT of multiplexor 311. The multiplexor 311, in turn, may select reference signal $AV_D$ to be one of a plurality of discrete reference signals $AV_{D1}$-$AV_{D4}$. For instance, in one embodiment the discrete reference signals $AV_{D1}$-$AV_{D4}$ may each have unique, discrete value (e.g., voltage) giving rise to a unique, discrete duty cycle. Alternatively, and additionally, in some embodiments there may be greater or fewer than four discrete reference signals $AV_{D1}$-$AV_{D4}$.

As one of ordinary skill in the art can appreciate, duty cycle state machine 150 can be realized using a variety of circuit approaches including digital and/or analog circuit blocks culling one or more system variables. For instance, as shown in the embodiment of FIG. 3, the duty cycle state machine 150 may use a signal $DB_{CLK}$ and a signal $DB_{EN}$ to determine a system state, and then based on the system state, may provide the control vector DTY. In some embodiments, the duty cycle state machine 150 can use counters to count cycles of signals like signal $DB_{CLK}$.

As shown in FIG. 3 and in FIG. 4, the signal $DB_{CLK}$ may be derived from the clock delay circuit 305 to have a waveform 406 with a rising edge shift delay relative to the oscillator signal $DB_{OSC}$. In providing signal $DB_{CLK}$ the clock delay circuit 305 uses an AND-gate 342 and a delay element 341 to perform a logical AND of the oscillator signal $DB_{OSC}$ with its delayed signal D2. FIG. 4 further illustrates the rising edge shift delay between the oscillator signal $DB_{OSC}$ and signal $DB_{CLK}$. As illustrated, the signal $DB_{CLK}$ has a rising edge shifted by a delay time dt to times t2 and t6 relative to the rising edge of the oscillator signal $DB_{OSC}$. In some embodiments the delay time dt may have a value of 200 ns.

Also, as shown in FIG. 3, the signal $DB_{EN}$ can be provided from RS-latch 310 to indicate when the signal $DB_{ON}$ is enabled and/or inhibited. In making this indication the RS-latch 310 receives the inverted oscillator signal $DB_{OSCB}$ at an input of NOR-gate 329 and receives the signal $DB_{ON}$ at an input of NOR-gate 328. When the signal $DB_{ON}$ is enabled to make clock transitions on a cycle by cycle basis, then the RS-latch 310 may assert the signal $DB_{EN}$ high. Additionally, when the signal $DB_{ON}$ is inhibited (i.e., asserted low), then the RS-latch 310 may assert and maintain the signal $DB_{EN}$ low following a high transition of the inverted oscillator signal $DB_{OSCB}$.

As one of ordinary skill in the art may also appreciate, a gate control module 204 can include greater or fewer components and use fewer or additional signals to generate the signal $DB_{ON}$. For instance, as shown in FIG. 3, $DB_{ON}$ may also be provided and/or inhibited based on an overcurrent condition relating to the sense signal $V_{IS}$. Circuit features relating to overcurrent protection may be traced back to comparator circuit 304. The comparator circuit 304 includes comparator 356 and AND-gate 308. The comparator 356 may assert an overcurrent signal $DB_{IS}$ based on a comparison of the sense signal $V_{IS}$ to a reference $V_{R1}$. Additionally, AND-gate 308 can provide signal D3 to an input of the OR-gate 307. In this way, the comparator circuit 304 can assert the signal D3 to logic high when the delayed clock signal D2 and the overcurrent signal $DB_{IS}$ are coincidentally in a logic high state. The OR-gate 307, in turn, can assert the signal R to logic high when the signal D3 is asserted high. Thus, the DFF 306 may reset the signal Q1 during an overcurrent condition.

Figure 5:
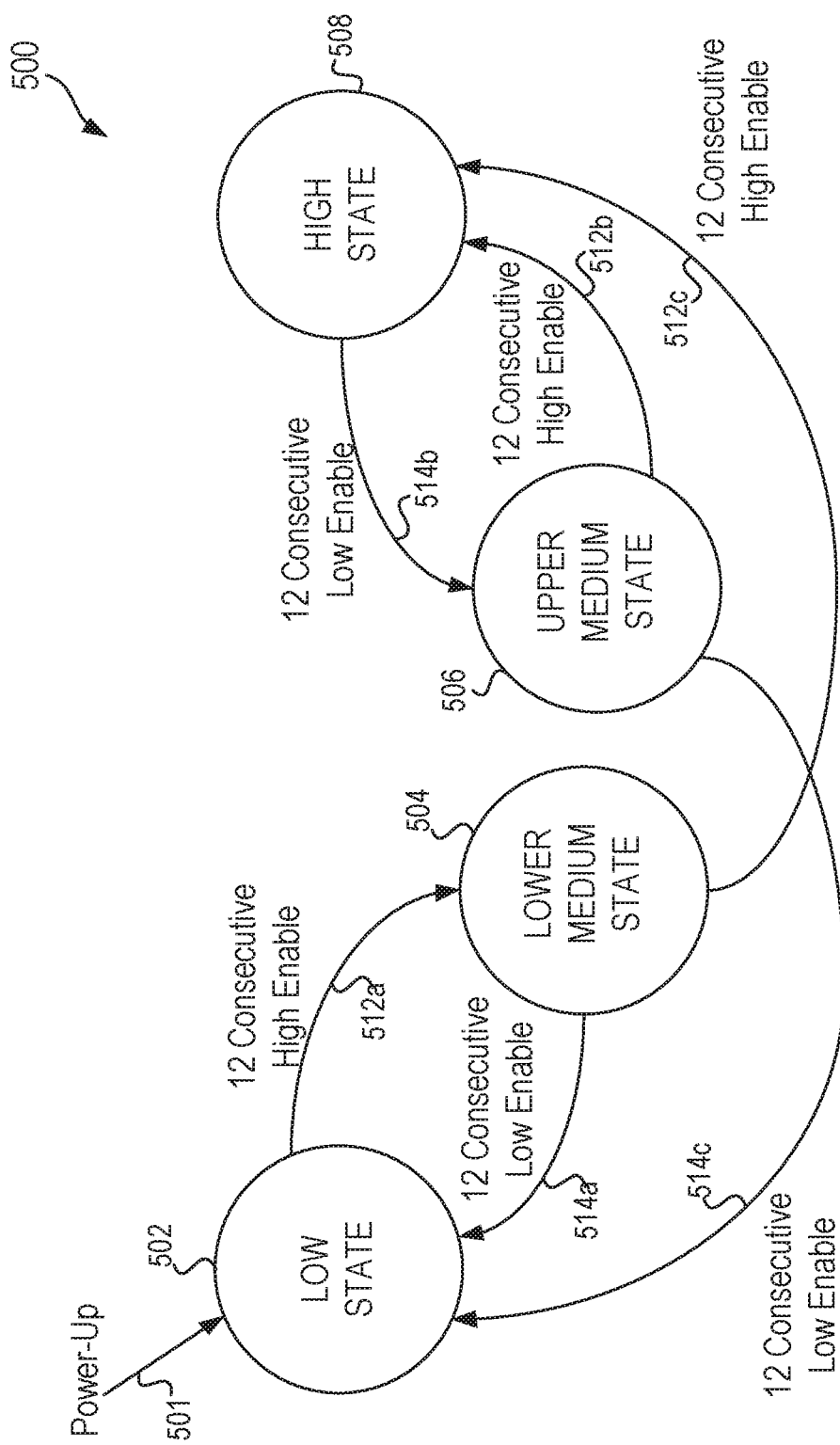
FIG. 5 illustrates an example state diagram of a duty cycle state machine according to an embodiment of the present invention.

FIG. 5 illustrates a state diagram 500 of a duty cycle state machine 150 according to an embodiment of the present invention. The state diagram 500 includes a low state 502, a lower medium state 504, an upper medium state 506, and a high state 508. According to the state diagram 500, a transition from the low state 502 to the lower medium state 504 can occur under a transition condition 512a, and a transition from the lower medium state 504 to the low state 502 can occur under a transition condition 514a. Also, a transition from the upper medium state 506 to the high state 508 can occur under a transition condition 512b, and a transition from the high state 508 to the upper medium state 506 can occur under a transition condition 514b. Additionally, a transition from the lower medium state 504 to the high state 508 can occur under a transition condition 512c, and a transition from the upper medium state 506 to the low state 502 can occur under a transition condition 514c.

Operation of a duty cycle state machine 150, as described herein, may be based, at least in part, upon state diagram 500 for providing the signal $DB_{ON}$ from a gate control module 204 as described above. Additionally, the gate control module 204 may be part of a larger system (e.g., the power conversion system 100b) having a controller 125 that provides a gate drive signal $V_{GB}$ to a switch (e.g., switch 154) in a switch mode power converter (e.g., switch mode power converter 108). The low state 502, medium low state 504, upper medium state 506, and high state 508 can be power related states indicating how much power is being delivered to a load 110. For instance, the low state 502 can refer to a duty cycle state whereby a duty cycle of the signal $DB_{ON}$ comprises a minimum value causing the switch 154 to transfer least power during a switching cycle. The high state 508 can refer to a duty cycle state whereby a duty cycle of the signal $DB_{ON}$ comprises a maximum value causing the switch 154 to transfer maximum power during a switching cycle. The lower medium state 504 and upper medium state 506 may similarly represent intermediate power states whereby a duty cycle of the signal $DB_{ON}$ comprises an intermediate value causing the switch 165 to transfer power between the least and maximum.

In one embodiment, operation in the high state 508 may correspond to providing the signal $DB_{ON}$ with a maximum duty cycle substantially equal to sixty five percent (i.e., a duty cycle of 0.65). Operation in the low state 502 may correspond to providing the signal $DB_{ON}$ with a minimum duty cycle substantially equal to forty percent of the maximum duty cycle (i.e., a duty cycle of 0.26). Additionally, operation in the lower medium state 504 may correspond to providing the signal $DB_{ON}$ with a duty cycle substantially equal to fifty percent of maximum duty cycle (i.e., a duty cycle of 0.325). Operation in the upper medium state 506 may correspond to providing the signal $DB_{ON}$ with a duty cycle substantially equal to seventy percent of the maximum duty cycle (i.e., a duty cycle of 0.455). With reference to FIG. 3, the duty cycle state machine 150 may control the duty cycle by providing a state dependent control vector DTY to the multiplexer 311. The multiplexer 311, in turn, provides a state dependent reference signal $AV_D$ based on control vector DTY.

According to the state diagram 500, the system of the gate control module 204 can enter the low state 502 during a power-up condition 501, which may refer to a condition of applying power to the switch mode power converter 108. Also, the transition conditions 512a-c and 514a-c can also be system power related conditions.

With reference to the discussion of FIG. 3, the transition conditions 512a-c and 514a-c can be based on a relationship of signals $DB_{CLK}$ and $DB_{EN}$ provided to the duty cycle state machine 150. For instance, the transition conditions 512a-c can refer to an "enabled consecutive cycle count" condition whereby the signal $DB_{CLK}$ undergoes twelve cycles while the signal $DB_{EN}$ is a logic high. This can also correspond to a condition of delivering power to the load 110 while the signal $DB_{ON}$ is enabled high and while the switch 154 undergoes twelve consecutive cycles. Also, the transition condition 514a-c can refer to an "inhibited consecutive cycle count" condition whereby the signal $DB_{CLK}$ undergoes twelve cycles while the signal $DB_{EN}$ indicates that the signal $DB_{ON}$ is enabled low. This can also correspond to a condition of inhibiting power transfer to the load 110 while the signal $DB_{ON}$ is inhibited for twelve consecutive cycles.

As described above, one way in which the signal $DB_{ON}$ can be enabled low (i.e., inhibited) and/or enabled high may be traced to a regulation condition of the feedback signal $V_{FB}$. For instance, as shown in FIG. 3, when the feedback signal $V_{FB}$ exceeds the reference $V_{R2}$, then the signal D1 transitions low and the signal $DB_{ON}$ becomes inhibited. By using the duty cycle state machine 150 according to the state diagram 500, the duty cycle may be controlled so that fewer cycles of a constant frequency signal (e.g., signal $DB_{ON}$) are skipped. In this way, audible noise may be reduced and/or eliminated.

Although FIG. 5 shows a state diagram 500 for controlling duty cycle based on a low state 502, lower medium state 504, upper medium state 506, and high state 508, other state diagrams are possible. For instance, a duty cycle state machine 150 can include fewer or greater discrete duty cycle states and may use transition conditions based on fewer or greater than twelve consecutive cycles. Additionally, the number of consecutive cycles may be chosen based on experiments (e.g., a design of experiments) for reducing audible noise. In some embodiments other state variables may also be introduced into the state machine. For instance, a duty cycle state machine 150 can also receive analog signals, such as a control loop error amplifier output signals, to be used as state variables.

Figure 6:
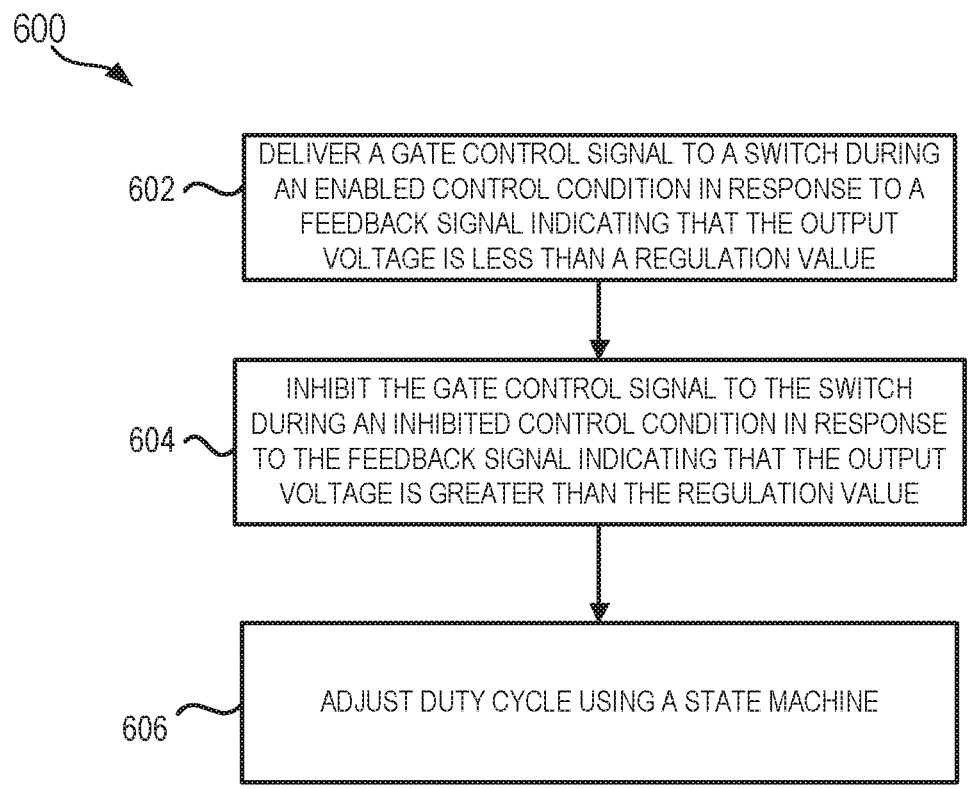
FIG. 6 illustrates a conceptual flow diagram for controlling an example switch mode power converter using a duty cycle state machine according to an embodiment.

FIG. 6 illustrates a conceptual flow diagram 600 for controlling a switch mode power converter 108 using a duty cycle state machine 150 according to an embodiment of the present invention. The conceptual flow diagram 600 includes a first operation 602, a second operation 604, and a third operation 606. Operation 602 can correspond to delivering a gate control signal (e.g., the signal $DB_{ON}$ from the gate control module 204 and/or the gate drive signal $V_{GB}$ from the controller 125). The gate control signal to the switch 154 may be delivered during an enabled condition relating to regulating output voltage $V_O$ relative to an output regulation value (e.g., when the feedback signal $V_{FB}$ is less than a reference $V_{R2}$). Operation 604 can correspond to inhibiting the gate control signal when the output voltage $V_O$ exceeds the regulation value (e.g., when the feedback signal $V_{FB}$ exceeds the reference $V_{R2}$). Operation 606 can correspond to controlling the duty cycle of the gate control signal (e.g., the signal $DB_{ON}$) using the duty cycle state machine 150.

The above description of illustrated examples of the present disclosure, including what is described in the Abstract, are not intended to be exhaustive or to be limiting to the precise forms disclosed. While specific embodiments of, and examples understanding for controlling a switch mode power converter using a duty cycle state machine are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

What is claimed is:

1. A system controller comprising:
   a duty cycle state machine configured to adjust a duty cycle of a gate drive signal according to a plurality of discrete duty cycle states, the plurality of discrete duty cycle states comprising:
      a first state during which the duty cycle is adjusted to a first value; and
      a second state during which the duty cycle is adjusted to a second value;
   wherein the system controller is configured to deliver the gate drive signal during an enabled control condition and to inhibit the gate drive signal during an inhibited control condition, and
   wherein the duty cycle state machine is configured to transition from the first state to the second state after the gate drive signal completes an enabled consecutive cycle count during the enabled control condition.

2. The system controller of claim 1,
   wherein the system controller is configured to deliver the gate drive signal during the enabled control condition in response to a feedback signal indicating an output voltage is less than a regulation value, and
   wherein the system controller is configured to inhibit the gate drive signal during the inhibited control condition in response to the feedback signal indicating the output voltage is greater than the regulation value.

3. The system controller of claim 1, wherein the second value is greater than the first value.

4. The system controller of claim 1, wherein the enabled consecutive cycle count is equal to twelve.

5. The system controller of claim 1, wherein the system controller is configured to deliver the gate drive signal to a switch of a switch mode power converter.

6. The system controller of claim 5, wherein the switch mode power converter comprises a boost converter.

7. The system controller of claim 1, wherein the gate drive signal has a constant frequency.

8. The system controller of claim 1, wherein the constant frequency is substantially equal to two hundred kilohertz (kHz).

9. The system controller of claim 1, wherein the duty cycle state machine is configured to transition from the second state to the first state after the gate drive signal completes an inhibited consecutive cycle count during the inhibited control condition.

10. The system controller of claim 9, wherein the inhibited consecutive cycle count is equal to twelve.

11. The system controller of claim 1, wherein the plurality of discrete duty cycle states comprises:
   a high state during which the duty cycle is adjusted to substantially equal a maximum duty cycle;
   an upper medium state during which the duty cycle is controlled to substantially equal to seventy percent of the maximum duty cycle;
   a lower medium state during which the duty cycle is controlled to substantially equal fifty percent of the maximum duty cycle; and
   a low state during which the duty cycle is controlled to substantially equal forty percent of the maximum duty cycle.

12. The system controller of claim 11, wherein the maximum duty cycle is sixty five percent.

13. The system controller of claim 11, wherein the duty cycle state machine is configured to transition to the low state during a power-up condition.

14. A controller comprising a gate control module, the gate control module comprising:
   a duty cycle state machine configured to control a duty cycle of a constant frequency gate signal; and
   a multiplexer configured to provide a state dependent reference signal selected from a plurality of discrete reference signals,
   wherein the controller is configured to provide the constant frequency gate signal to a switch when an output voltage is less than a regulation value and to inhibit the constant frequency gate signal to the switch when the output voltage is greater than the regulation value.

15. The controller of claim 14, wherein the gate control module further comprises a variable duty cycle square wave generator configured to provide a square wave in relation to a triangle wave, wherein the square wave has a duty cycle based, at least in part, upon the state dependent reference signal, and wherein the constant frequency gate signal is proportional to the square wave.

16. The controller of claim 15 further comprising:
a buffer coupled to the variable duty cycle square wave generator to buffer the square wave so as to provide the constant frequency gate signal.

17. The controller of claim 15, wherein the gate control module comprises a triangle wave generator configured to provide the triangle wave to the variable duty cycle square wave generator.

18. The controller of claim 15, wherein the duty cycle state machine is configured to provide a control vector to the multiplexer based on a system state.

19. The system controller of claim 14, wherein the duty cycle state machine is configured to adjust the duty cycle of the constant frequency gate signal according to a plurality of discrete duty cycle states comprising:
a high state during which the duty cycle is adjusted to substantially equal a maximum duty cycle;
an upper medium state during which the duty cycle is controlled to substantially equal to seventy percent of the maximum duty cycle;
a lower medium state during which the duty cycle is controlled to substantially equal fifty percent of the maximum duty cycle; and
a low state during which the duty cycle is controlled to substantially equal forty percent of the maximum duty cycle.

20. The controller of claim 19, wherein the maximum duty cycle is sixty five percent.

* * * * *